Jan. 14, 1969  C. R. KING ET AL  3,421,424
PHOTOGRAPHIC ROLL FILM HOLDER
Filed Sept. 29, 1965  Sheet 1 of 3
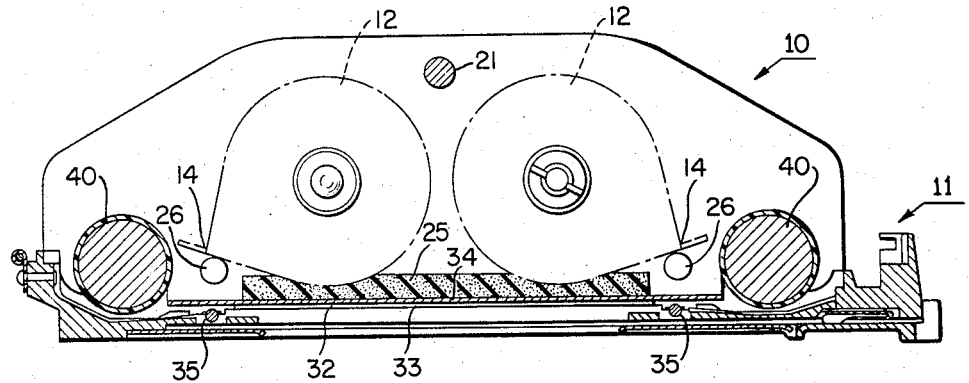
FIG. 2
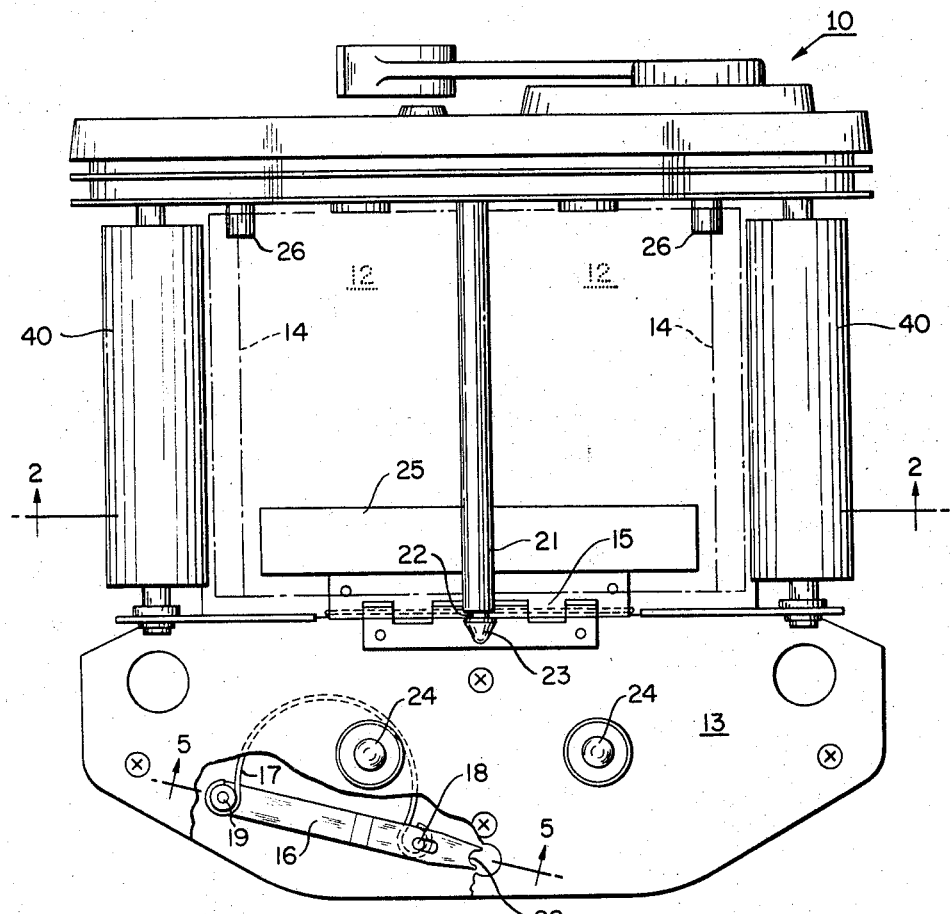
FIG. 1
FIG. 5
INVENTORS
CHARLES R. KING
WILLIAM R. SANDERSON
BY
*Crumpston & Shaw*
ATTORNEYS 3,421,424
PHOTOGRAPHIC ROLL FILM HOLDER
Charles R. King, East Rochester, and William R. Sanderson, Irondequoit, N.Y., assignors to Graflex, Inc., Rochester, N.Y., a corporation of New York
Filed Sept. 29, 1965, Ser. No. 491,108
U.S. Cl. 95—34           13 Claims
Int. Cl. G03b 19/04

ABSTRACT OF THE DISCLOSURE

A photographic roll film holder arranges supply and take-up spools behind the image plane and supports one end of such spools on a hinged opening wall. Film between such spools is guided over a pair of guide rollers extending forward of the image plane and over a pair of flattening rollers at the image plane to produce substantial transverse bends in the film to flatten it in the image plane.

---

This invention relates to photographic roll film holders.

An object of the invention is easier loading and unloading of a photographic roll film holder together with positioning of the film more accurately and in a flatter orientation in the image plane of the holder.

Another object of the invention is to make an improved photographic roll film holder that can be manufactured more economically and that is functional, serviceable, reliable, and easier to use and maintain.

These and other objects of the invention will be apparent hereinafter from the specification, the drawings which form a part of the disclosure, and from the subject matter claimed. Specific preferred embodiments of the invention will hereinafter be more fully described, the inventive subject matter being claimed at the end of this specification.

In the drawings:

FIG. 1 shows a plan view of a carriage for the inventive roll holder;

FIG. 2 shows a cross section of the carriage of FIG. 1 taken along the line 2—2 together with a corresponding frame;

FIG. 5 shows a fragmentary cross section of the latch member for the hinged wall of the carriage of FIG. 1 taken along the line 5—5;

Figure 4:
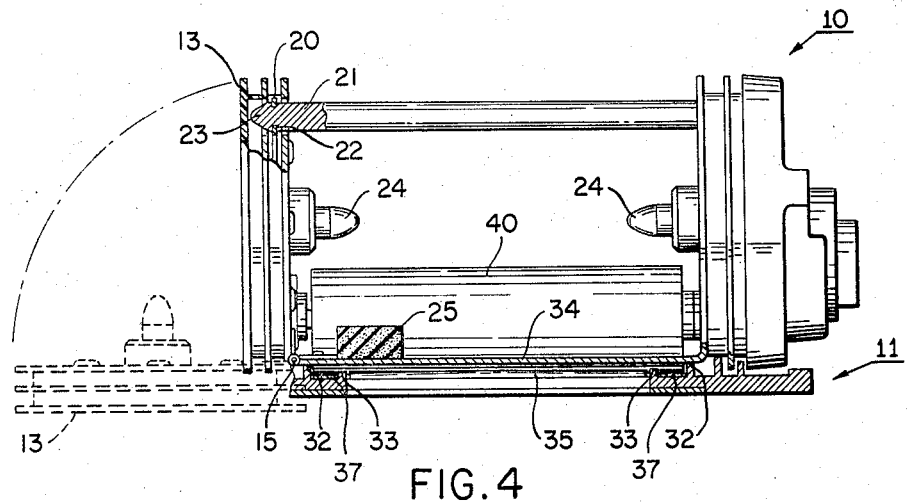
FIG. 4 shows a partially sectioned, partially cutaway view of the carrier and frame.
Figure 3:
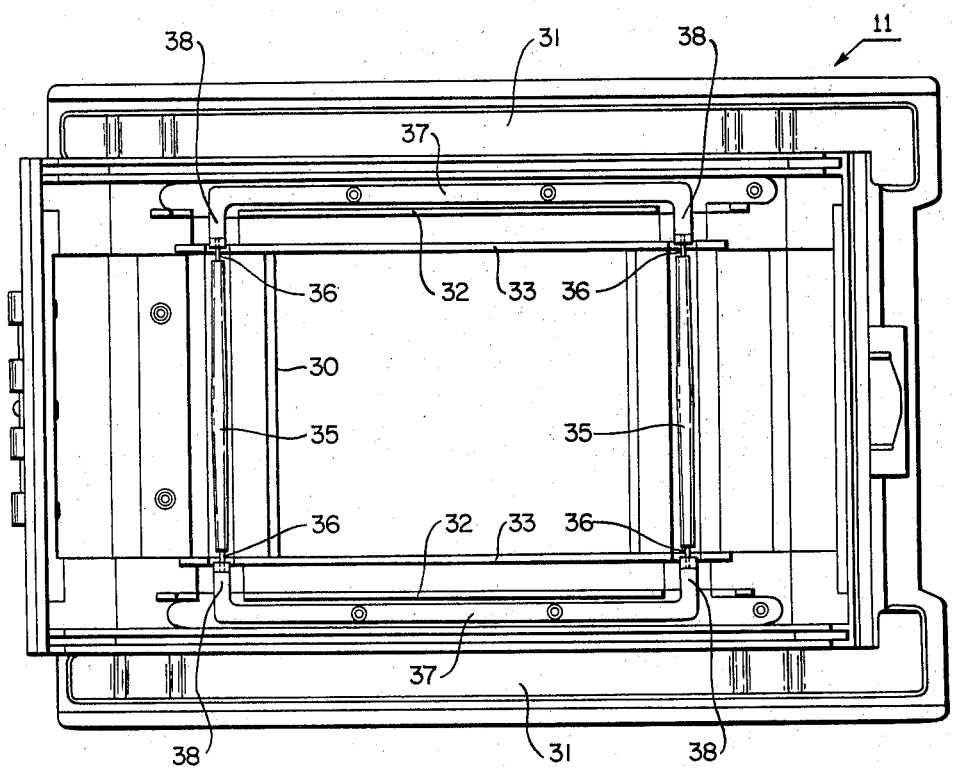
FIG. 3 shows a plan view of the frame for the inventive roll holder.

Generally, the invention is embodied in a photographic roll film holder in which roll film is contained preferably in a pair of cassettes removably mounted behind the image plane for the holder. Preferably, the film cassettes are carried by an assembly that is removably engagable with a frame having an exposure aperture adjacent the image plane for the film. By such an arrangement a film tunnel is formed between the carriage and the frame for engaging the longitudinal edges of a film strip and for disposing the film accurately and flatly at the desired image plane. One wall of the carriage assembly is preferably hinged and pivotal outward to facilitate loading and unloading of the cassettes and location of the film. A pair of film guide rollers on the carriage assembly are preferably disposed to extend forward of the image plane when the carriage is in operative engagement with the frame, and a pair of flattening rollers on the frame are preferably disposed adjacent and on opposite sides of the exposure aperture and substantially in the image plane. The flattening rollers and the guide rollers are each arranged transversely of the film strip and are preferably spaced from each other longitudinally of the film path so that film is transversely bent as it passes over each flattening roller to preserve its natural curl and assure flat orientation of the film in the film tunnel.

These and other features of the invention will be described in more detail relative to the preferred embodiment illustrated in the drawings throughout which corresponding parts have been given the same reference numerals.

A forerunner of the inventive photographic roll film holder is shown in U.S. Patent No. 2,716,929 to C. E. Smith and is similar in that roll film is disposed on a carriage adapted to be removably secured to a frame or base by a hinged cover. The carriage and the frame cooperate to form a film tunnel in which the film is disposed in the image plane of the holder. A dark slide is provided for removably covering an exposure aperture in the frame, and the film rolls are disposed behind the image plane which is near the exposure aperture in the frame. Corresponding members of the illustrated holder include carriage 10, and frame 11, but for simplicity of illustration, the dark slide and the cover enclosing carriage 10 in light-tight engagement with frame 11 have been omitted.

In the illustrated inventive holder, film is preferably housed within cassettes 12 best illustrated in phantom in FIGS. 1 and 2. Each of the cassettes 12 has a light-trapped opening 14 through which film is threaded from one cassette to the other in the holder. The path and positioning of film strip 50 in the holder will be described in more detail later after loading, unloading, and positioning of the cassettes within the holder has been described.

One end of each cassette 12 is preferably supported by a trunnion 24, and to facilitate loading and unloading of cassettes 12, wall 13, bearing trunnions 24, is connected to carriage 10 so as to be movable or openable outward. A preferred motion for opening wall 13 is a pivotal one, and preferably, a hinge 15 connects wall 13 to carriage 10 as best shown in FIGS. 1 and 4. By such connection, wall 13 can be swung from its solid line position in FIGURE 4 to its broken line position.

With wall 13 in its open position, a cassette 12 bearing a supply roll of film can be slipped into place in carriage 10, and film can be wrapped around the face of the carriage to allow the take-up cassette to be slipped in place. After cassettes 12 and their film strip are properly placed, wall 13 can be swung to its closed position as illustrated in FIG. 4 to retain and support cassettes 12 in their operative location.

Wall 13 is preferably releasably latched in its closed position, and a preferred latch mechanism for such purpose is best illustrated in FIGS. 1 and 5. Latch bar 16 is preferably biased forward by spring 17 toward support pin 18 and is movable rearwardly by manual movement of stud 19. The latching end 20 of latch bar 16 is adapted to engage groove 22 near the end of bar 21, and the tip 23 of bar 21 is preferably sloped so that the latching end 20 will ride out to the periphery of bar 21 and then snap into engagement with groove 22 when wall 13 is moved to its closed position. To pivot wall 13 outward, it is merely necessary to move stud 19 so as to retract latch tip 20 from groove 22, and then swing wall 13 outward.

As best shown in FIGS. 1 and 2, a cushioning and positioning strip 25 preferably of foamed plastic material is arranged for assisting in locating cassettes 12 properly within carriage 10. As supported by strip 25 as illustrated in FIG. 2, cassettes 12 are approximately positioned to receive trunnions 24 on wall 13.

Of course, other hinge and latch arrangements are possible for opening or moving wall 13 outward to obtain the advantages of easy loading and unloading of cassettes 12. Also, other devices can be substituted for supporting strip 25, or such strip can be eliminated entirely wtihin the spirit of the invention.

After loading cassettes 12 in place carriage 10 and frame 11 are secured together in light-tight relation as best illustrated in FIGS. 2 and 4, and film 50 is guided from one cassette to another so as to lie in the image plane of the holder and within the film tunnel formed between the carriage 10 and frame 11. The easy loading and unloading of cassettes facilitates the threading or disposing of film 50 along the proper path before securing carriage 10 to frame 11, and carriage 10 and frame 11 interact in helping to locate the film accurately in the image plane as desired. Some of the details of frame 11 and carriage 10 that effect the location of film will first be described, and then the interaction between carriage 10 and frame 11 for accurate film positioning will be described.

Frame 11 has an opening 30 providing an exposure aperture adjacent the image plane of the holder. Aperture 30 is formed in base 31 of frame 11 and is preferably selectively obstructed by a conventional dark slide, not shown. Base 31 is preferably configured for releasable engagement with the rear of a camera, and is configured to receive carriage 10 in light-tight relation.

Figure 7:
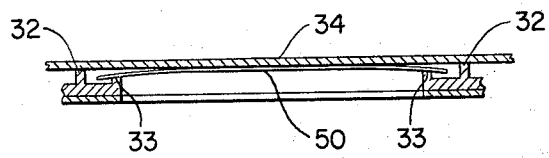
FIG. 7 shows a cross section view of the desired disposition of a film strip within a film tunnel in the inventive holder.
Figure 8:
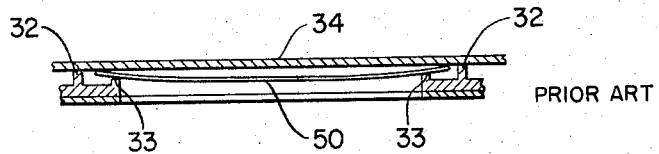
FIG. 8 shows a cross section of undesirable prior art reverse curvature of film in a film tunnel.

A film tunnel is formed between carriage 10 and frame 11 at the image plane of the holder. Front surface 34 of carriage 10 provides the main backing wall for such tunnel. A pair of ridge-like surfaces 32 are preferably machined to form an accurate locating means for the forward surface 34 of carriage 10. Preferably parallel surfaces 33 extend toward carriage 10 a lesser distance than surfaces 32 as best shown in FIGS. 7 and 8 so as to be spaced a small amount from surface 34 of carriage 10. When carriage 10 and frame 11 are in operative engagement, the side edges of a film strip 50 extend over or beyond surfaces 33 and into the space between surfaces 33 and 32, and surface 34 of carriage 10 provides a location backing for a film strip 50 so disposed.

A pair of film flattening rollers 35 are preferably disposed near opposite ends of aperture 30 to assist in flattening film strip 50 within the film tunnel. Flattening rollers 35 are of relatively small diameter and are preferably disposed as best shown in FIG. 4 with their upper surfaces approximately even with surfaces 33 and substantially in the image plane for the holder.

Journals 36 are formed on the ends of flattening rollers 35 and are preferably disposed in slots formed below surfaces 33. It is preferred that such journal-housing slots be rectangular or formed with flat walls for relatively little contact with journals 36 to reduce rolling friction for rollers 35.

Flattening rollers 35 are preferably removable from the slots in which they are journaled, and to this end, resilient strips 37 having retaining arms 38 are disposed to keep journals 36 from leaving the slots in which they are housed unless resilient arms 38 are foceably lifted. By lifting arms 38, flattening rollers 35 can be easily removed from their slots for cleaning or replacement, thus greatly facilitating maintenance of the inventive holder.

A pair of guide rollers 40 are mounted preferably near the ends of carriage 10 for guiding film from one cassette to the other and through the film tunnel.

Referring particularly to FIG. 7, the natural transverse curl of film 50 is emulsion-side-in as illustrated. Such natural curl tends to force film strip 50 flat against tunnel backing surface 34 and to bring the longitudinal edges of film strip 50 into engagement with forward bearing surfaces 33 of the film tunnel. In such orientation, film strip 50 is disposed nearly flat and accurately positioned within the film tunnel for correct exposure.

The natural longitudinal curl of film wound on spools in cassettes 12 is also emulsion-side-in, and as film 50 is passed over roller 40, it is bent in a curvature opposite to the normal with the emulsion side out. This reversing of the normal longitudinal curvature tends to reverse the normal transverse curvature described above and to orient film 50 in the film tunnel in the position illustrated in FIG. 8. Thus, as illustrated, the central portion of film strip 50 is spaced from backing surface 34, and the edges of the film strip are curled toward the backing surface rather than toward forward tunnel surfaces 33. This produces a displacement of film strip 50 from its desired position in the image plane and causes incorrect exposures.

Figure 6:
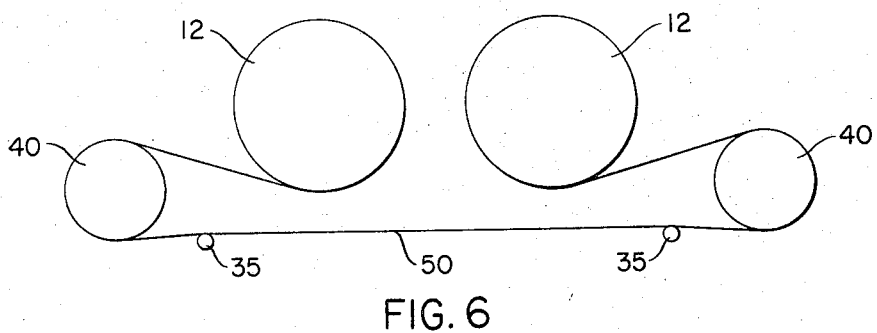
FIG. 6 shows a schematic view of guide rollers and flattening rollers for the inventive film holder.

We have discovered that the normal transverse curvature of the film strip can be restored by bending the film slightly in a longitudinal emulsion-side-in curvature between guide rollers 40 and the tunnel. This is preferably accomplished by disposing guide rollers 40 slightly forward of flattening rollers 35 as schematically illustrated in FIG. 6. Bending of the film toward its normal curl by the flattening rollers 35 thus restores the normal transverse curvature so that film 50 lies flat within the film tunnel as described above and illustrated in FIG. 7. Heretofore guide rollers and flattening rollers have been disposed substantially in the same plane, and the curl restoring advantages of an extra bend impressed in the film by the flattening rollers has not been recognized.

The normal, emulsion-side-in bending of the film as it passes over flattening rollers 35 can be a relatively small angle and still accomplish the desired purpose. Also, it is preferred that a minimum of tension be applied to film strip 50 as it is passed through the holder, since increased tension tends to exaggerate film curling and to reduce the efficiency of the flattening rollers in restoring natural film curl.

Flattening rollers 35 are preferably spaced some distance longitudinally of the film path from guide rollers 40 so that a free and relatively unobstructed reach of film extends from guide rollers 40 to flattening rollers 35. Although all the details and refinements of film curvatures in the inventive holder are not fully understood, it appears that a small reach of unsupported film between guide rollers 40 and associated flattening rollers 35 helps the film uncurl and recover from its reverse bend around guide rollers 40 and facilitates the restoration of the normal film curvature by flattening rollers 35. Further, such an arrangement, as contrasted with flattening rollers that bear against a film strip in contact with a respective guide roller, eliminates any need for spring loading flattening rollers against guide rollers and permits more economical manufacture.

Occasionally, film is stored in a holder for a considerable time between exposures, and unnatural, reverse bends are impressed in the film by its prolonged curvature around guide rollers 40. As such film is advanced into the image plane for exposure, a reverse bend in the film from its long engagement with the guide roller 40 on the supply side of the holder is disposed in the exposure area. This bend tends to bulge the film forward of the image plane in which it would normally lie and causes error in the image formed on the film.

Figure 9:
FIG. 9 shows a flattening roller according to the invention.

According to the invention, such an unnatural bulge in the film is eliminated by increasing the diameter of the central sections of flattening rollers 35. This somewhat lengthens the distance the central area of the film must travel, and tends to dispose the film flatly in its normally curled orientation in the image plane. The diameters of the central sections of the flattening rollers can be increased by tapering their ends as illustrated in FIG. 9, forming them as slightly barrel-shaped, or adding a sleeve to their central portion.

Other features, advantages, and other specific embodiments of this invention will be apparent to those exercising ordinary skill in the pertinent art after considering the foregoing disclosure. In this regard, while specific preferred embodiments of our invention have been described in considerable detail, such disclosure is intended as illustrative, rather than limiting, and other embodiments, variations, and modifications can be effected within the spirit and scope of the invention as disclosed and claimed.

We claim:

1. In a photographic roll film holder having a frame provided with an aperture through which film can be exposed, and a carriage removably engaging said frame in light-tight relation therewith, the improvement comprising:
   (a) means arranged on a fixed wall of said carriage for removably supporting one end of each of a pair of spools for holding said photographic roll film;
   (b) means for opening the opposite wall of said carriage outward to facilitate loading and removing of said spools and positioning of said film;
   (c) means arranged on said opening wall for removably supporting the other ends of each of said pair of spools when said opening wall is in a closed position;
   (d) a pair of guide rollers arranged on said carriage and over which said film is bent for guiding said film from one spool to the other;
   (e) a pair of flattening rollers mounted on said frame adjacent said aperture; and
   (f) said guide rollers and said flattening rollers being disposed on opposite sides of said film and arranged relative to each other when said carriage and said frame are in operative engagement so that said flattening rollers form substantial transverse bends in said film opposite to the bends of said film around said guide rollers.

2. The holder of claim 1 wherein said opening means comprises a hinge and wherein latch means is arranged for releasably securing said hinged wall in said closed position.

3. The holder of claim 2 wherein said spools are housed in respective cassettes and said supporting means comprise trunnions.

4. The holder of claim 1 wherein said spools are disposed behind the image plane of said holder, said flattening rollers are disposed approximately at the image plane of said holder, and said guide rollers extend forward of said image plane when said carriage and said frame are in operative engagement.

5. The holder of claim 4 wherein said guide rollers are spaced from said flattening rollers a substantial distance longitudinally of the path of travel of said film, and the space between said guide rollers and said flattening rollers is relatively unconfined so that an unsupported reach of film extends between said guide rollers and said flattening rollers.

6. The holder of claim 4 including a film tunnel approximately at said image plane and defined by said carriage and ridges on said frame projecting toward said carriage and wherein said guide rollers are of relatively large diameter and said flattening rollers are of relatively small diameter.

7. The holder of claim 6 wherein said flattening rollers are thicker in their central portions than at their end portions.

8. The holder of claim 6 wherein the ends of said flattening rollers are rotatably disposed in slots, and movable resilient means are arranged for retaining said flattening rollers in said slots.

9. The holder of claim 6 wherein the ends of said flattening rollers are generally cylindrical and said slots are generally rectangular.

10. In a photographic roll film holder having a frame provided with an aperture through which film can be exposed, a film image plane adjacent said aperture, a carriage removably engaging said frame in light-tight relation therewith, and a film tunnel approximately at said image plane and defined by said carriage and ridges on said frame projecting toward said carriage, the improvement comprising:
    (a) means arranged on said carriage for removable supporting a pair of spools behind said image plane for holding said photographic roll film;
    (b) a pair of relatively small diameter flattening rollers mounted on said frame adjacent said aperture disposed approximately at said image plane;
    (c) a pair of relatively large diameter guide rollers arranged on said carriage and over which said film is bent for guiding said film from one spool to the other, said guide rollers extending forward of said image plane when said carriage and said frame are in operative engagement so that flattening rollers form substantial transverse bends in said film opposite to the bends of said film around said guide rollers; and
    (d) said guide rollers being spaced from said flattening rollers a substantial distance longitudinally of the path of travel of said film, and the space between said guide rollers and said flattening rollers being relatively unconfined so that an unsupported reach of film extends between each of said guide rollers and said flattening rollers.

11. The holder of claim 10 wherein said flattening rollers are thicker in their central portions than at their end portions.

12. The holder of claim 10 wherein the ends of said flattening rollers are rotatably disposed in slots, and movable resilient means are arranged for retaining said flattening rollers in said slots.

13. The holder of claim 12 wherein the ends of said flattening rollers are generally cylindrical and said slots are generally rectangular.

References Cited

UNITED STATES PATENTS

| | | | |
|---|---|---|---|
| 1,927,887 | 9/1933 | Crespinel | 352—228 XR |
| 2,364,381 | 12/1944 | Mihalyl | 242—71 |
| 2,462,687 | 2/1949 | Stava | 95—34 XR |
| 2,666,375 | 1/1954 | Bing | 242—71.2 XR |
| 2,716,929 | 9/1955 | Smith | 95—34 |
| 3,128,687 | 4/1964 | Dahlgren | 95—34 |

NORTON ANSHER, *Primary Examiner.*

J. F. PETERS, JR., *Assistant Examiner.*

U.S. Cl. X.R.

352—223; 242—71.2